United States Patent
Zhang et al.

(10) Patent No.: US 9,398,754 B2
(45) Date of Patent: Jul. 26, 2016

(54) LOW-DUST ANIMAL LITTERS AND METHODS FOR MAKING SAME

(71) Applicant: Nestec SA, Vevey (CH)

(72) Inventors: Yimin Zhang, Ballwin, MO (US); Emily Alison Jemmott, St. Louis, MO (US); Gustavo Vera, St. Louis, MO (US)

(73) Assignee: Nestec SA, Vevey (CH)

( * ) Notice: Subject to any disclaimer, the term of this patent is extended or adjusted under 35 U.S.C. 154(b) by 96 days.

(21) Appl. No.: 13/896,520

(22) Filed: May 17, 2013

(65) Prior Publication Data

US 2013/0319341 A1    Dec. 5, 2013

Related U.S. Application Data

(60) Provisional application No. 61/653,068, filed on May 30, 2012.

(51) Int. Cl.
*A01K 29/00* (2006.01)
*A01K 1/015* (2006.01)

(52) U.S. Cl.
CPC .............. *A01K 1/0152* (2013.01); *A01K 1/0154* (2013.01); *A01K 1/0155* (2013.01)

(58) Field of Classification Search
CPC .................................................. A01K 1/0154
USPC ........................................................ 119/173
See application file for complete search history.

(56) References Cited

U.S. PATENT DOCUMENTS

| | | | |
|---|---|---|---|
| 4,428,984 A | 1/1984 | Shimizu et al. | |
| 4,770,878 A | 9/1988 | Thomas | |
| 2005/0005869 A1* | 1/2005 | Fritter et al. | 119/173 |
| 2007/0017453 A1* | 1/2007 | Fritter et al. | 119/173 |
| 2007/0289543 A1* | 12/2007 | Petska et al. | 119/173 |
| 2008/0223302 A1* | 9/2008 | Wang et al. | 119/173 |
| 2008/0308045 A1* | 12/2008 | Fritter et al. | 119/173 |
| 2009/0007852 A1* | 1/2009 | Fritter et al. | 119/173 |
| 2011/0185977 A1* | 8/2011 | Dixon et al. | 119/173 |
| 2013/0139760 A1* | 6/2013 | Fritter et al. | 119/173 |

FOREIGN PATENT DOCUMENTS

| | | |
|---|---|---|
| CN | 1568671 | 1/2005 |
| EP | 0985341 | 3/2000 |
| EP | 0990689 | 4/2000 |
| WO | 2011134074 | 11/2011 |

OTHER PUBLICATIONS

Written Opinion of International Application No. PCT/US2013/041529 dated Jul. 4, 2013.
International Search Report of International Application No. PCT/US2013/041529 dated Jul. 4, 2013.
International Preliminary Report on Patentability for International Application No. PCT/US2013/041529 dated Dec. 2, 2014.
Communication of European publication number and information for Application No. 13725035.3 dated Jan. 11, 2015.
English Translation of Chinese Office Action for Chinese Application No. 2013800339705 dated Nov. 12, 2008.

* cited by examiner

*Primary Examiner* — Kristen C Hayes
(74) *Attorney, Agent, or Firm* — Julie M. Lappin

(57) ABSTRACT

Low-dust animal litters made from one or more ingredients that function as an animal litter and one or more polyols that function to control dust in the litter are described herein. The low-dust animal litters are made by selecting one or more litter ingredients suitable for making an animal litter and combining the litter ingredients with one or more polyols, generally by applying the polyols to the surface of one or more ingredients before or during the process of combining the ingredients to produce the litter.

20 Claims, No Drawings

LOW-DUST ANIMAL LITTERS AND METHODS FOR MAKING SAME

CROSS REFERENCE TO RELATED APPLICATIONS

This application claims priority to U.S. Provisional Application No. 61/653,068 filed May 30, 2012, the disclosure of which is incorporated herein by this reference.

BACKGROUND OF THE INVENTION

1. Field of the Invention

The invention relates generally to animal litters and particularly to low-dust animal litters and methods for making such low-dust animal litters.

2. Description of Related Art

Animal litters are made from various ingredients, e.g., clays such as bentonite; woods such as pine and cedar; wood byproducts such as sawdust; grains and ground grains such as corn; agricultural products and byproducts such as corncob and dried distillers grains; silica gel; paper; cellulose; and mixtures thereof.

Generally, these animal litters are made by transporting, grinding, mixing, sizing, rolling, packaging, or otherwise processing the ingredients used to make the litter. As a result of this handling and processing, fine particles of the litter ingredients are often produced. These fine particles, generally referred to as "dust" in the art, cause various problems for the litter manufacturers and users. For example, the dust adversely affects the operation of litter production and handling equipment, causes environmental problems for production personnel, and must be disposed of in an environmentally acceptable manner. Similarly, the dust adversely affects the animal and the animal caregiver using the litter when the dust contaminates the environment where the litter is used, e.g., the dust is tracked into the environment by the animal.

Methods for reducing or eliminating dust from animal litters are known in the art. For example, U.S. Pat. No. 5,826,543 discloses clumpable animal litters containing polytetrafluoroethylene resin as a dust reducing agent. U.S. Pat. No. 5,469,809 discloses a non-dusting clumping animal litters. US20060201438A1 discloses clumping, non-dusting calcium carbonate-based animal litters. US20090126642A1 discloses litter boxes that minimize the generation of dust into the environment when the animal uses a litter. U.S. Pat. No. 6,854,421 discloses animal litters and methods of fabricating same that are dust free. U.S. Pat. No. 6,089,189 discloses scoopable cellulosic animal litters that are treated to reduce dust. U.S. Pat. No. 7,316,201 discloses non-clumping animal litter granules having reduced dust. U.S. Pat. No. 5,526,770 discloses biodegradable dust less cat litters. U.S. Pat. No. 5,229,348 discloses animal litter granules and method of processing peanut hulls in producing cat litter that is dust free. U.S. Pat. No. 5,196,473 discloses litter granules exhibiting reduced dusting that can be used as a litter.

Generally, these litters function to some extent for their intended purpose, i.e., managing litter dust while functioning as a litter. However, there is a need for new methods for reducing dust associated with the manufacture and use of animal lifters and new low-dust animal litters.

SUMMARY OF THE INVENTION

It is, therefore, an object of the invention to provide low-dust animal litters.

It is another object of the invention to provide methods for producing low-dust animal litters.

It is another object of the invention to provide methods for managing animal waste using low-dust animal litters.

These and other objects are achieved using low-dust animal litters comprising one or more ingredients that function as an animal litter and one or more polyols that function to reduce dust in the litter. In preferred embodiments, the low-dust animal utters further comprise binders and/or other ingredients that enhance the physical and/or functional properties of the litter.

Additional and further objects, features, and advantages of the invention will be readily apparent to those skilled in the art.

DETAILED DESCRIPTION OF THE INVENTION

Definitions

The term "dust" means small solid litter panicles, often defined as panicles below 250 μm in diameter, that slowly settle out of the atmosphere under the influence of gravity.

The term "low-dust animal litter" means that an animal litter treated using the methods and compounds of the invention that has at least 50% less dust compared to the same animal litter not treated with the methods and compounds of the invention.

All percentages expressed herein are by weight of the total weight of the composition unless expressed otherwise.

As used throughout, ranges are used herein in shorthand, so as to avoid having to set out at length and describe each and every value within the range. Any appropriate value within the range can be selected, where appropriate, as the upper value, lower value, or the terminus of the range.

As used herein and in the appended claims, the singular form of a word includes the plural, and vice versa, unless the context clearly dictates otherwise. Thus, the references "a", "an", and "the" are generally inclusive of the plurals of the respective terms. For example, reference to "a clay" or "a method" includes a plurality of such "clays" or "methods". Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that, which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice, of the present, invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent, applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect, the invention provides low-dust animal litters. The low-dust animal litters comprise one or more ingredients that function as an animal litter and one or more polyols that function to reduce dust in the litter. The litter ingredients can be any suitable compound, composition, or other material that functions as an animal litter. Generally, the litter ingredients are litter ingredients that tend to create dust when used to manufacture animal litters or litter ingredients that tend to create dust when the litter is used for its intended purpose. Typically, the litter ingredients are selected from clays, woods, agricultural products, agricultural byproducts, and the like.

Clays useful in the invention are any clay useful for producing animal litters. In various embodiments, the clays are non-swelling clays, swelling clays, or combinations thereof. The clays can be clays that are obtained directly by mining natural clay deposits, synthetic clays, or clays that are derived from the agglomeration of clay particles, e.g., clay particles produced, by litter or other manufacturing processes that involve the use of clays.

Non-swelling clays include kaolinites, illites, ventriculites, attapulgites, sepiolites, and non-swelling smectites. In preferred embodiments, the non-swelling clays are rich in the following clay minerals; palygorskite sepiolite, kaolinite, dickite, nacrite, illite, glauconite, celadonite, and phengite. Most preferably, the non-swelling clays contain the clay minerals Ca-montmorillonite, kaolinite, and illite.

Swelling clays include smectites and swelling forms of kaolinites, illites, and vermiculites. In preferred embodiments, the swelling clays contain one or more of hectorite, beidelite, montmorillonite, nontronite, saponite, sauconite, vermiculite, and halloysite. More preferably, the clay is bentonite, e.g., a Na-montmorillonite (Na-bentonite). Generally, bentonite is a naturally occurring combination of clay minerals and some non-clay mineral constituents. Na-bentonite is rich in Na-montmorillonite but may also include other clay and some non-clay mineral constituents. In various embodiments, the swelling clays contain Na-montmorillonite, hectorite, and vermiculite.

When used in combination, the non-swelling and swelling clays can be mixed in any amount suitable for forming the animal litters. Generally, the non-swelling and swelling clays can be mixed in amounts of from about 10 to about 90% non-swelling clay and from about 90 to about 10% swelling clay.

Woods useful in the invention are any woods useful for forming animal litters. Generally, the woods, are cedar, pine, oak, maple, eucalyptus, aspen, yucca, or combinations thereof. In preferred embodiments, the woods are cedar, pine, or combinations thereof. In various embodiments, the pine is New Zealand Pine or Southern Yellow Pine and the cedar is Western Red Cedar. The woods have any form suitable for functioning as an animal litter, e.g., chips, particles, pellets, crumbled pellets, crumbles, and the like. In preferred embodiments, the woods are cedar, pine, or a combination thereof.

Agricultural products and agricultural byproducts useful in the invention are any agricultural products and agricultural byproducts useful for forming animal litters. Generally, the agricultural products and agricultural byproducts are alfalfa, corn, corn stalk, corn flour, oat hull, oat stalk, oat flour, barley hull, barley meal, barley stalk, barley flour, wheat hull, wheat straw, wheat flour, soybean hull, soybean meal, soybean floor, rye hull, rye meal, rye straw, rye flour, rice straw, rice hull, sorghum straw, sorghum hull, sunflower seeds, or combinations thereof. In some embodiments, the agricultural products or agricultural byproducts are plants such as bamboo, lemongrass, switchgrass, catnip, oregano, parsley, rosemary, sage, thyme, valerian root, alyssum, chrysanthemum, honeysuckle, hops, lavender, apples, berries, orange peels, orange pulp, sunflower hulls, coffee, tea, or combinations thereof. In other embodiments, the agricultural products and agricultural byproducts are sawdust, paper, cellulose, corncob, corn kernel, Distillers Dried Grain (DDG), corn pellet, oaf pellet, barley pellet, wheat middlings, soybean pellet, rye pellet, rice grain, rice pellet, sorghum grain, sorghum pellet, or combinations thereof. In still other embodiments, the agricultural products and agricultural byproducts are sunflower seed, almond, pistachio, walnut, pecan, hazelnut, peanut, acorn, wheat middlings, wheat straws, or combinations thereof.

In one preferred embodiment, the agricultural products and agricultural byproducts are wood and corncob. In a more, preferred embodiment, the agricultural products and agricultural byproducts are cedar, pine, and corncob. The woods have an appealing appearance and naturally release an aroma. The corncob has excellent liquid absorption properties and will absorb the majority of an added liquid, e.g., urine. Also, the cedar, pine, and corncob have an enhanced ability to interact with polyols compared to other litter ingredients.

Polyols useful in the invention are any polyols that reduce dust in the litter compared to the same litter without the polyols, e.g., monomelic or polymeric polyols. In preferred embodiments, the polyols are selected from glycerol, sorbitol, propylene glycol, butylene glycol, mono-propylene glycol, polydextrose, pentaerythritol, ethylene glycol, polyethylene glycol, polypropylene glycol, sucrose, mannitol, maltitol, or combinations thereof. In preferred embodiments, the polyol is glycerol.

Generally, the low-dust litters comprise from about 0.2 to about 30% polyol(s) and from about 99.8 to about 70% of other litter ingredients. In certain embodiments, the low-dust litters comprise from about 1 to about 20% polyol(s) and from about 99 to about 80% of other litter ingredients, preferably from about 2 to about 10% polyol(s) and from about 98 to about 90% of other litter ingredients, more preferably 2 to about 8% polyol(s) and from about 98 to about 92% of other litter ingredients.

In other embodiments, the low-dust animal litters of the invention further comprise one or more binders that promote clump formation. Any binder that promotes clump formation can be used. Binders useful in the invention include natural and synthetic gums, carbohydrates, proteins, and other hydrophilic polymers. Specific examples include carboxymethylcellulose (CMC), locust bean gum, xanthan gum, konjac gum, arable gum, cassia gum, agar agar, alginates, carrageenans, gelatin, pectins, wheat gluten, starches, blood plasma, partially hydrolyzed soy protein, partially hydrolyzed dairy proteins, or combinations thereof. In one preferred embodiment, the binder is guar gum. When added, the binders comprise from about 0.5 to about 20% of the low-dust animal litter, preferably from about 1 to about 12%, more preferably from about 1.5 to about 8%.

In a preferred embodiment, the low-dust animal litter comprises from about 2 to about 40% of one or more woods, preferably from about 5 to about 30%, more preferably from about 10 to about 20%; from about 50 to about 95% corncob, preferably from about 60 to about 90%, more preferably from about 70 to about 80%; from about 0.1 to about 10% polyols, preferably from about 0.5 to about 8%, more preferably from about 1 to about 6%; and from about 0.5 to about 12% binders, preferably from about 1 to about 10%, more preferably from about 2 to about 8%. Preferably, the wood particles are cedar, pine, or a combination thereof; the polyol is glycerol; and the binder is guar gum.

In some embodiments, the low-dust animal litters further comprise materials that enhance the function and properties of the litter. Examples of such agents include antimicrobials, malodor reducing materials, fragrances, health indicating materials, color altering agents, dust reducing agents, superabsorbent materials, cyclodextrins, zeolites, activated, carbon, baking soda, pH altering agents, salt forming materials, ricinoleates, or combinations thereof. When added, the agent is added in any useful amount. Generally, the agent comprises from about 0.01 to about 2% of the low-dust animal litter, preferably from about 0.05 to about 1%, depending on the agent and its use.

The low-dust animal litters of the invention are useful for a variety of purposes, ether than just as an animal litter. For example, the low-dust animal litters can be used to treat water, treat wastewater, manage liquid spills, and the like.

In another aspect, the invention provides methods for making low-dust animal litters. The methods comprise selecting one or more litter ingredients suitable for use as an animal litter and combining the litter ingredients with one or more polyols. Suitable litter ingredients and suitable polyols and the amounts of such litter ingredients and polyols are given herein when describing the low-dust animal litter of the invention, including various litter ingredients such as binders, fragrances, malodor counteractants, and the like. Often, binders such a various hydrocolioids are added, to the litter to help with clumping and other functional properties.

Generally the litter ingredients and polyols are combined using any suitable method, e.g., mixing, coating, spraying, stirring, and the like.

In some embodiments, all the litter ingredients and polyols are mixed to produce the low-dust animal litter, in others, the polyols are applied to one or more litter ingredients and the litter ingredients with the applied polyols are subsequently combined with other litter ingredients to produce the low-dust animal litter.

In preferred embodiments, the polyols are applied to the litter ingredients by spraying the polyols onto the surface of the litter ingredients.

The polyols can be combined with the litter ingredients without dilution or can be diluted with or dissolved in water or other solvents when the polyols are viscous liquids or solids. Diluting the polyols facilitates handling and using the polyols and makes if easier and more convenient to combine the polyols with the Utter ingredients. For example, polyol solutions containing polyols in amounts of from about 5 to about 90% of one or more polyols can be used. When glycerol is the polyol, the glycerol can be combined with water to produce glycerol solutions that are mixed with or applied to the litter ingredients. Typically, such solutions contain glycerol in amounts of from about 5 to about 95% polyols, e.g., 1 to 12%, 40 to 60%, or 70 to 80%.

The order of addition of the litter ingredients can be any order suitable for producing a low-dust animal litter. In certain embodiments, the polyols and one or more litter ingredients are combined then mixed with other litter ingredients to produce a low-dust litter. For example, to produce a low-dust litter based on wood and corncob, the polyol(s) are applied to the surface of the corncob, typically by spraying the polyols onto the corncob particles, and the corncob coated with the polyols is subsequently mixed with wood particles and other optional ingredients to produce a low-dust animal litter. In others, the corncob and wood particles are mixed and the polyol(s) are applied to the corncob and wood particles, e.g., by spraying the polyols onto the particles, and the polyol coated panicles are combined with the other litter ingredients. In another embodiment, the polyol(s) are applied to the surface of corncob, a binder is combined with the polyol coated corncob, and the polyol coated corncob and binder mixture is subsequently mixed with wood particles and other optional ingredients to produce a low-dust animal litter.

In one preferred embodiment, corncob is coated with polyol(s), the hydrocolioid guar gum is added to the mixture, and then pine and cedar particles are added to this mixture produce a low-dust animal litter. In another, corncob, pine, and cedar are mixed; polyol(s) are added to the mixture; and then guar gum is added to the mixture to produce a low-dust animal litter.

In another aspect, the invention provides methods for managing waste, particularly animal waste such as feces and urine. The methods comprise contacting the waste with a low-dust animal litter comprising one or more ingredients that function as an animal litter and one or more polyols that function to reduce dust in the litter.

Generally, the low-dust animal litter is placed in a litter box or other suitable container and the animal is allowed to deposit its waste (urine or feces, but preferably urine) so that it comes in contact with the low-dust animal litter. If desirable, the low-dust, animal litter can be placed, in contact with the waste after the waste is deposited, e.g., on a lawn.

In another aspect, the invention provides an animal litter box comprising a device suitable for containing low-dust animal litter and suitable for use by an animal when excreting animal waste and one or more low-dust animal litters of the invention. The device is any device suitable for use by an animal and compatible with an animal litter of the invention. Many such devices are known in the art and available commercially, e.g., the litter boxes disclosed in US20090250014A1, US20090272327A1, US20090000560A1, US20070277740A1, U.S. Pat. No. 7,628,118 and the like.

In a further aspect, the invention provides kits suitable for containing low-dust animal litters useful for managing waste, particularly animal waste. The kits comprise in separate containers in a single package or in separate containers in a virtual package, as appropriate for the kit component, a low-dust animal litter of the invention and one or more of (1) a device suitable for containing the low-dust animal litter and suitable for use by an animal when excreting animal waste, e.g., a fitter box; (2) a device suitable for handling animal waste that has been deposited with the low-dust animal litter, e.g., a scoop for removing animal feces from a litter (e.g., U.S. Pat. No. 7,523,973 or a rake suitable for arranging an animal litter in a litter box or other container; (3) a different animal litter, e.g., a different animal litter suitable for creating a mixture of the low-dust animal litter of the invention and such different animal litter; (4) instruction for how to use the low-dust animal litter to manage waste, particularly animal waste; and (5) instructions for how to dispose of the low-dust animal litter, e.g., how to dispose of the litter in an environmentally friendly manner, particularly after it has been used.

When the kit comprises a virtual package, the kit is limited to instructions in a virtual environment in combination with one or more physical kit components. The kits may contain the kit components in any of various combinations and/or mixtures. In one embodiment, the kit contains a package containing the low-dust animal litter of the present invention and a scoop suitable for removing animal waste from the low-dust animal litter.

In another aspect, the invention provides packages comprising a material suitable for containing a low-dust animal litter of the invention and a label affixed to the package containing a word or words, picture, design, acronym, slogan, phrase, or other device, or combination thereof, that indicates that the contents of the package contains a low-dust animal litter of the invention, e.g., information about the low-dust animal litters enhanced properties, more desirable appearance, and effective malodor control or other physical, functional, or related properties. Typically, such device comprises the words "low-dust litter" or "natural ingredients with low-dust properties" or "environmentally friendly litter having low-dust" or "animal litter having low-dust properties" or "low-dust" or an equivalent expression printed on the package. Any package or packaging material suitable for containing animal litters is useful in the invention, e.g., a bag, box, bottle, can, pouch, and the like manufactured from paper, plastic, foil, metal, and the like. In one embodiment, the package further comprises a low-dust animal litter of the invention.

In another aspect, the invention provides a means for communicating information about or instructions for using a low-dust animal litter of the invention for one or more of (1) managing wastes, e.g., animal waste such as animal urine and feces; (2) keeping environmental dust from the litter at a minimum, particularly after use; and (3) disposing of the used low-dust animal litter. The means comprises a document, digital storage media, optical storage media, audio presentation, or visual display containing the information or instructions. In certain embodiments, the communication means is a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, and any combination thereof. Useful information includes one or more of (1) methods and techniques for training or adapting an animal to use the litter; (2) functional or other properties of an animal litter of the invention, particularly those relating to minimizing environmental dust, from use, e.g., tracking; and (3) contact information for to use by a consumer or others if there is a question about the litter and its use. Useful instructions include methods for cleaning and disposing of the litter. The communication means is useful for instructing on the benefits of using the present invention and communicating the approved methods for using the invention for an animal or other purpose.

EXAMPLES

The invention can be further illustrated by the following examples, although it will be understood that the examples are included merely for purposes of illustration and are not intended to limit the scope of the invention unless otherwise specifically indicated.

Example 1

Preparation of sample 1A: In a DP-14 Agglo-miser (manufactured by Mars Mineral, Mars, Pa.), 2190 g of corncob particles (0.4-2.38 mm in size), 270 g of cedar wood particles and 405 g of pine wood particles (0.3-2.38 mm in size) were blended thoroughly for 2 minutes. While the corncob and wood particles were being mixed, 105 g of guar gum powder (<0.15 mm in size) was gradually added into the mix. The entire procedure took less than 5 minutes.

Dust measurement of sample 1A: In a DustMon L instrument (manufactured by AnaTec, Norway), 150 cubic centimeter of sample 1A was dropped into the measurement area. The instrument captured the reduction of light intensity over 30 seconds, and recorded the "dust area" value. The measurement was taken three times and averaged. The results are shown in Table 1.

Example 2

Preparation of Sample 1B: In a DP-14 Agglo-miser (manufactured by Mars Mineral, Mars, Pa.), 2190 g of corncob particles (0.4-2.38 mm in size), 270 g of cedar wood particles and 405 g of pine wood particles (0.3-2.38 mm in size) were blended thoroughly. While the corncob and wood particles were being mixed, 33 g of 9.1% glycerol solution was sprayed onto the mixture, 105 g of guar gum powder (<0.1.5 mm in size) was gradually added into the mix.

Dust measurement of sample 1B: The procedure for the "Dust measurement of sample 1A" was repeated for sample 1B. The results are shown in Table 1.

Examples 3 through 6

Preparation of sample 1C through 1F: The procedures used for preparing samples 1C through 1F and for measuring dust for the samples were the same as the procedures given in Example 2, but using the ingredients shown in Table 1. The results of the dust measurement are shown in Table 1.

TABLE 1

| Sample Number | 1A | 1B | 1C | 1D | 1E | 1F |
|---|---|---|---|---|---|---|
| Ingredients | | | | | | |
| Corncob Particles | 2190 | 2190 | 2190 | 2190 | 2190 | 2190 |
| Cedar Wood Particles | 270 | 270 | 270 | 270 | 270 | 270 |
| Pine Wood Particles | 405 | 405 | 405 | 405 | 405 | 405 |
| 9.1% Glycerol Solution | | 33 | 66 | | | |
| 33.3% Glycerol Solution | | | | 45 | 90 | 180 |
| Guar Gum Powder | 105 | 105 | 105 | 105 | 105 | 105 |
| Dust Area | 59.3 | 48.2 | 36.4 | 42.1 | 36.0 | 28.0 |
| Standard Deviation | 1.2 | 4.0 | 2.7 | 3.1 | 1.8 | 2.25 |

Referring to Table 1, the data clearly show that the use of polyols, particularly glycerol, in animal litters produce low-dust animal litters.

Example 7

Preparation of sample 2A: In a DP-14 Agglo-miser (manufactured by Mars Mineral, Mars, Pa.), 2190 g of corncob panicles (0.4-2.38 mm in size), 270 g of cedar wood particles and 405 g of pine wood particles (0.3-2.38 mm in size) were blended thoroughly for 2 minutes. While the corncob and wood particles were being mixed, 66 g of 9.1% glycerol solution was sprayed onto the mixture, 105 g of guar gum powder (<0.1.5 mm in size, was gradually added into the mix. The entire procedure took less than 5 minutes.

Dust measurement of sample 2A: The procedure for the "Dust measurement of sample 1A" was repeated for sample 2A. The results are shown in Table 2.

Example 8

Preparation of sample 2B: In a DP-14 Agglo-miser (manufactured by Mars Mineral, Mars, Pa.), 2190 g of corncob particles (0.4-2.38 mm in size), 270 g of cedar wood particles and 405 g of pine wood particles (0.3-2.38 mm in size) were blended thoroughly for 2 minutes. While the corncob and wood particles were being mixed, 120 g of 50% glycerol solution was sprayed onto the mixture. 105 g of guar gum powder (<0.15 mm in size) was gradually added into the mix.

Dust measurement of sample 2B: The procedure for the "Dust, measurement of sample 1A" was repeated for sample 2B. The results are shown in Table 2.

Examples 9 through 13

Preparation of Sample 2C through 2G: The procedures used for preparing samples 2C through 2G and for measuring dust for the samples were the same as the procedure given in Example 8, but using the ingredients shown in Table 2. The results of the dust measurement are shown in Table 2.

TABLE 2

| Sample Number | 2A | 2B | 2C | 2D | 2E | 2F | 2G |
|---|---|---|---|---|---|---|---|
| Ingredients | | | | | | | |
| Corncob Particles | 2190 | 2190 | 2190 | 2190 | 2190 | 2190 | 2190 |
| Cedar Wood Particles | 270 | 270 | 270 | 270 | 270 | 270 | 270 |
| Pine Wood Particles | 405 | 405 | 405 | 405 | 405 | 405 | 405 |
| 9.1% Glycerol Solution | 66 | | | | | | |
| 50% Glycerol Solution | | 120 | 180 | | | | |
| 75% Glycerol Solution | | | | 120 | 180 | | |
| 100% Glycerol | | | | | | 120 | 180 |
| Guar Gum Powder | 105 | 105 | 105 | 105 | 105 | 105 | 105 |
| Dust Area | 29.4 | 21.5 | 20.2 | 13.7 | 14.1 | 8.2 | 6.9 |
| Standard Deviation | 4.5 | 4.1 | 1.1 | 1.0 | 0.5 | 1.5 | 1.7 |

Referring to Table 2, the data clearly show that the use of polyols, particularly glycerol, in animal litters produce low-dust animal litters.

Example 14

Preparation of sample 3A: In a DP-14 Agglo-miser (manufactured by Mars Mineral, Mars, Pa.), 2130 g of corncob particles (0.4-2.38 mm in size) was added and stirred with a meshed metal spatula. While the corncob was being stirred, 150 g of 90% glycerol solution was gradually sprayed onto the corncob particles in approximately 2 minutes. While the glycerol coated corncob particles were being stirred, 111 g of guar gum powder (<0.15 mm in size) was added into the mix, followed by addition of 270 g cedar wood particles and 405 g pine wood particles (0.3-2.38 mm in size). The entire procedure took less than 5 minutes.

Dust measurement of sample 3A: The procedure for the "Dust measurement of sample 1A" was repeated for sample 3A. The results are shown in Table 3.

Examples 15 through 22

Preparation of Samples 3B through 3I: The procedures used for preparing samples 3B through 3I and for measuring dust for the samples were the same as the procedure given in Example 14, using the ingredients shown in Table 3. The results of the dust measurement are shown in Table 3.

TABLE 3

| Sample Number | 3A | 3B | 3C | 3D | 3E | 3F | 3G | 3H | 3I |
|---|---|---|---|---|---|---|---|---|---|
| Ingredients | | | | | | | | | |
| Corncob Particles | 2130 | 2130 | 2130 | 2130 | 2130 | 2130 | 2130 | 2130 | 2130 |
| 90% Glycerol Solution | 150 | | | | | | | | |
| Neosorb70/02sg (69% Sorbitol) | | 150 | | | | | | | |
| Neosorb70/20 (66% Sorbitol) | | | 150 | | | | | | |
| Neosorb70/90 s (47% Sorbitol) | | | | 150 | | | | | |
| Hydrosorban75/45 (40% Mailitol and 22% Sorbitol) | | | | | 150 | | | | |
| Polyethylene Glycol 200 | | | | | | 150 | | | |
| Polyethylene Glycol 400 | | | | | | | 150 | | |
| Polypropylene Glycol 400 | | | | | | | | 150 | |
| Polypropylene Glycol 1000 | | | | | | | | | 150 |
| Guar Gum Powder | 111 | 111 | 111 | 111 | 111 | 111 | 111 | 111 | 111 |
| Cedar Wood Particles | 240 | 240 | 240 | 240 | 240 | 240 | 240 | 240 | 240 |
| Pine Wood Particles | 360 | 360 | 360 | 360 | 360 | 360 | 360 | 360 | 360 |
| Dust Area | 10.9 | 7.0 | 10.2 | 6.0 | 7.2 | 9.9 | 5.4 | 7.4 | 3.9 |
| Standard Deviation | 1.8 | 0.5 | 2.3 | 0.4 | 0.2 | 0.5 | 0.8 | 4.1 | 0.6 |

Referring to Table 3, the data clearly show that the use of polyols, particularly glycerol, in animal litters produce low-dust animal litters.

Example 23

Preparation of sample 4A: In a DP-14 Agglo-miser (manufactured by Mars Mineral, Mars, Pa.), 2130 g of corncob particles (0.4-2.38 mm in size) was added and stirred with a meshed metal spatula. While the corncob was being stirred, 150 g of 90% glycerol solution was gradually sprayed onto the corncob particles in approximately 2 minutes. While the glycerol coated corncob particle was being stirred, a mixture of 60 g of guar gum powder (<0.15 mm in size) and 60 g CMC gum powder was added into the mix, followed by addition of 240 g cedar wood particles and 360 g pine wood particles (0.3-2.38 mm in size). The entire procedure took less than 5 minutes.

Dust measurement of sample 4A: The procedure for the "Dust measurement of sample 1A" was repeated for sample 4A. The results are shown in Table 4.

Examples 24 through 31

Preparation of Samples 4B through 4I: The procedures used for preparing samples 4B through 4I and for measuring dust for the samples were the same as the procedure given in Example 23, using the ingredients shown in Table 4. The results of the dust measurement are shown in Table 4.

TABLE 4

| Prototype Numbers | 4A | 4B | 4C | 4D | 4E | 4F | 4G | 4H | 4I |
|---|---|---|---|---|---|---|---|---|---|
| Ingredients | | | | | | | | | |
| Corncob Particles | 2130 | 2130 | 2130 | 2130 | 2130 | 2130 | 2130 | 2130 | 2130 |
| 90% Glycerol Solution | 150 | 150 | 150 | 150 | 150 | 150 | 150 | 150 | 150 |
| Guar Gum Powder | 60 | | | | | | | | |
| CWS Starch Powder | | 120 | 60 | 120 | 60 | | | | |
| Xanthan Gum Powder | | 120 | 180 | | | 240 | 90 | | |
| Agglomerated Xanthan Gum Powder | | | | 120 | 180 | | | 240 | 90 |
| CMC Powder | 60 | | | | | | 90 | | 90 |
| Cedar Wood Particles | 240 | 240 | 240 | 240 | 240 | 240 | 240 | 240 | 240 |
| Pine Wood Particles | 360 | 360 | 360 | 360 | 360 | 360 | 360 | 360 | 360 |
| Dust Area | 8.3 | 15.1 | 12.1 | 8.7 | 12.6 | 6.7 | 9.0 | 10.5 | 8.6 |
| Standard Deviation | 1.4 | 5.0 | 2.0 | 3.0 | 1.0 | 0.4 | 0.4 | 2.4 | 1.0 |

Referring to Table 4, the data clearly show that the use of polyols, particularly glycerol, in animal litters produce low-dust animal litters.

Examples 32 through 38

Preparation of Samples 5A through 5G: The procedures used for preparing samples 5A through 5G and for measuring dust for the samples were the same as the procedure given in Example 23, using the ingredients shown in Table 5. The results of the dust measurement are shown in Table 5.

TABLE 5

| Prototype Numbers | 5A | 5B | 5C | 5D | 5E | 5F | 5G |
|---|---|---|---|---|---|---|---|
| Ingredients | | | | | | | |
| Corncob Particles | 2130 | 2130 | 2130 | 2130 | 2130 | 2130 | 2130 |
| Neosorb70/02SG (69% sorbitol) | 150 | 150 | 150 | 150 | 150 | 150 | 150 |
| Guar Gum Powder | 111 | | | | | | |
| CWS Starch Powder | | 120 | 60 | | | | |
| Xanthan Gum Powder | | | | 240 | 90 | | |
| Agglomerated Xanthan Gum Powder | | 120 | 180 | | | 240 | 90 |
| CMC Powder | | | | | 90 | | 90 |
| Cedar Wood Particles | 240 | 240 | 240 | 240 | 240 | 240 | 240 |
| Pine Wood Particles | 360 | 360 | 360 | 360 | 360 | 360 | 360 |
| Dust Area | 9.6 | 11.7 | 15.4 | 12.7 | 12.6 | 8.8 | 12.3 |
| Standard Deviation | 0.3 | 1.1 | 3.3 | 4.3 | 1.4 | 1.6 | 1.8 |

Referring to Table 5, the data clearly show that the use of polyols, particularly glycerol, in animal litters produce low-dust animal litters.

In the specification, there have been disclosed typical preferred embodiments of the invention and, although specific terms are employed, they are used in a generic and descriptive sense only and not for purposes of limitation. Obviously many modifications and variations of the invention are possible in light of the above teachings. It is therefore to be understood that the invention may be practiced otherwise than as specifically described.

What is claimed is:

1. A low-dust animal litter comprising:
   from about 2 to about 40% of one or more woods;
   from about 50 to about 95% corncob;
   from about 0.1 to about 10% polyols; and
   from about 0.5 to about 12% binders.

2. The litter of claim 1 wherein the woods are cedar, pine, oak, maple, eucalyptus, aspen, yucca, or combinations thereof.

3. The litter of claim 1, wherein the polyols are selected from monomeric polyols, polymeric polyols, or combinations thereof.

4. The litter of claim 1 wherein the polyols are selected from glycerol, sorbitol, propylene glycol, butylene glycol, mono-propylene glycol, polydextrose, pentaerythritol, ethylene glycol, polyethylene glycol, polypropylene glycol, sucrose, mannitol, maltitol, or combinations thereof.

5. The litter of claim 1 further comprising activated carbon, baking soda, or combinations thereof.

6. The litter of claim 1 wherein the binders are carboxymethylcellulose (CMC), locust bean gum, xanthan gum, arable gum, cassia gum, agar agar, alginates, carrageenans, gelatin, pectins, wheat gluten, blood plasma, partially hydrolyzed soy protein, partially hydrolyzed dairy proteins, or a combination thereof.

7. The litter of claim 1 comprising about 5 to about 30% of one or more woods.

8. The litter of claim 1 comprising about 10 to about 20% of one or more woods.

9. The litter of claim 1 comprising about 60 to about 90% corncob.

10. The litter of claim 1 comprising about 70 to about 80% corncob.

11. The litter of claim 1 comprising about 0.5 to about 8% polyol.

12. The litter of claim 1 comprising about 1 to about 6% polyol.

13. The litter of claim 1 comprising about 1 to about 10% binder.

14. The litter of claim 1 comprising about 2 to about 8% binder.

15. The litter of claim 1 wherein the wood particles are cedar, pine, or a combination thereof.

16. The litter of claim 1 wherein the polyol is glycerol, sorbitol, or a combination thereof.

17. The litter of claim 1 wherein the binder is guar gum.

18. A method for making a low-dust animal litter comprising: combining from about 2 to about 40% of one or more woods; from about 50 to about 95% corncob; from about 0.1 to about 10% polyols; and from about 0.5 to about 12% binders.

19. The method of claim 18 wherein the woods, corncob, binders, and polyols are mixed.

20. The method of claim 18 wherein the polyols are applied to one or more of the woods, corncob, and binder and the woods, corncob, and/or binder with the applied polyols are subsequently mixed with other of the woods, corncob, and/or binder.

* * * * *